Aug. 12, 1924.

T. WADGE ET AL 1,504,533

SHOCKING MACHINE

Filed Sept. 1, 1920   5 Sheets-Sheet 1

INVENTORS
T. Wadge
B.J. Desmond
By
ATTYS

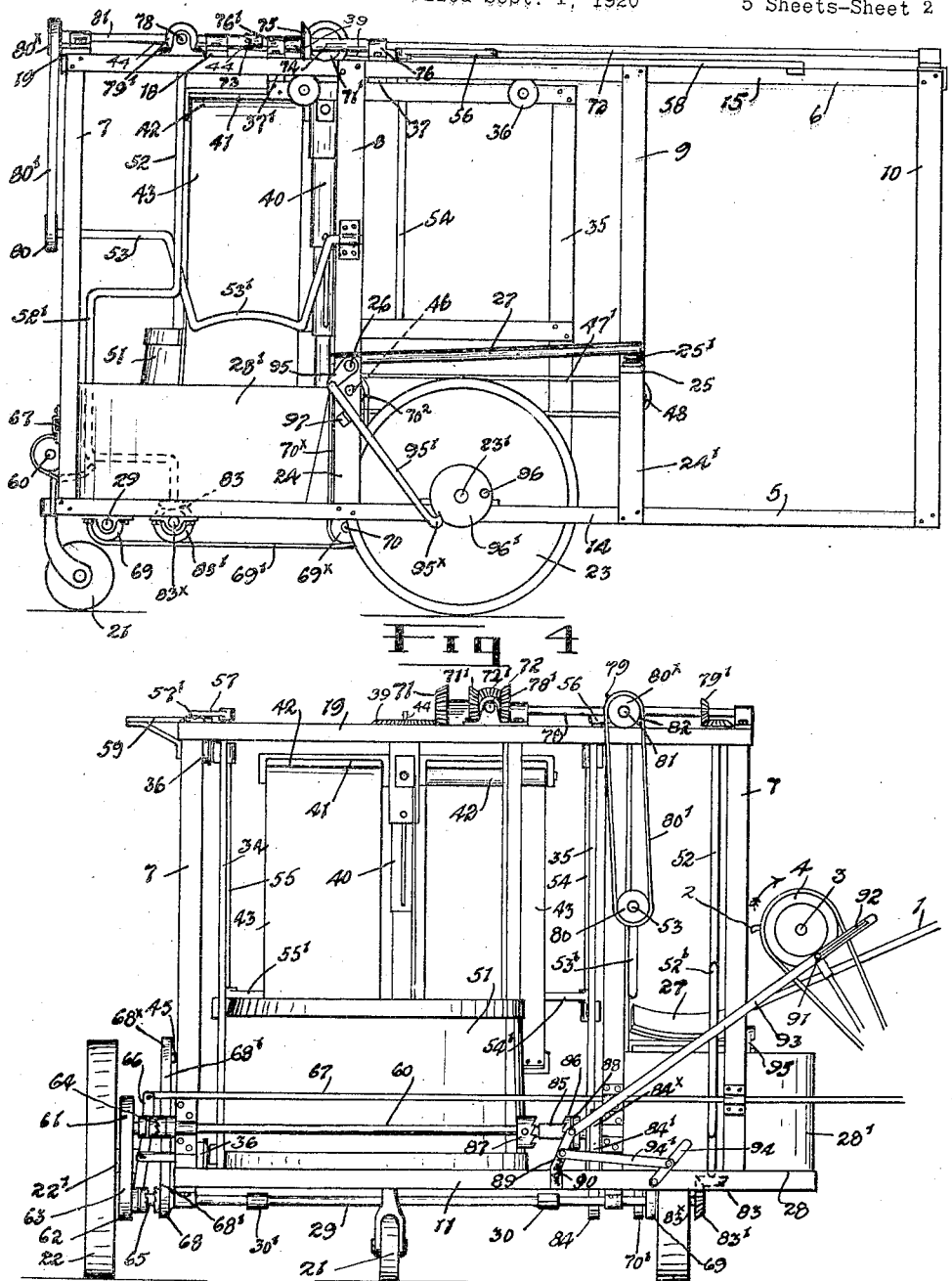

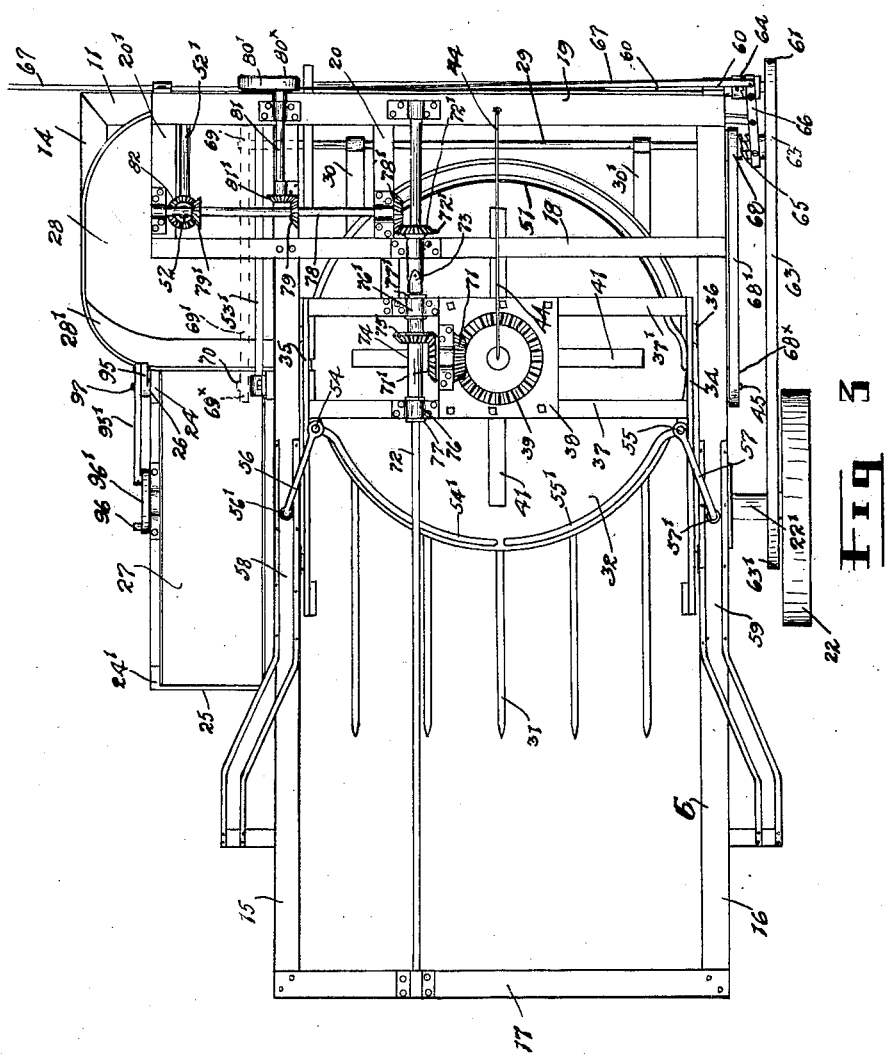

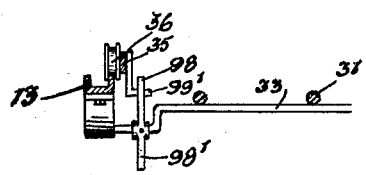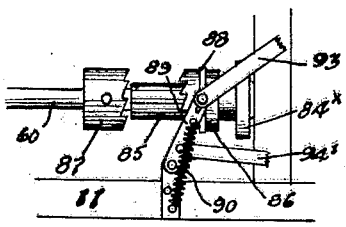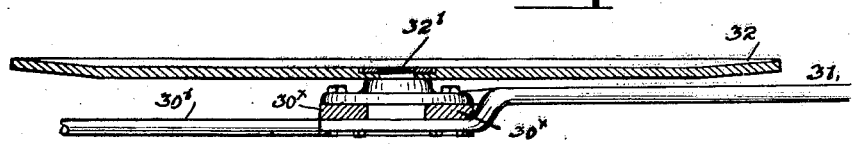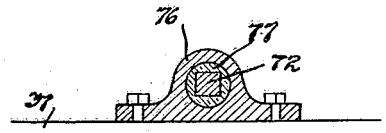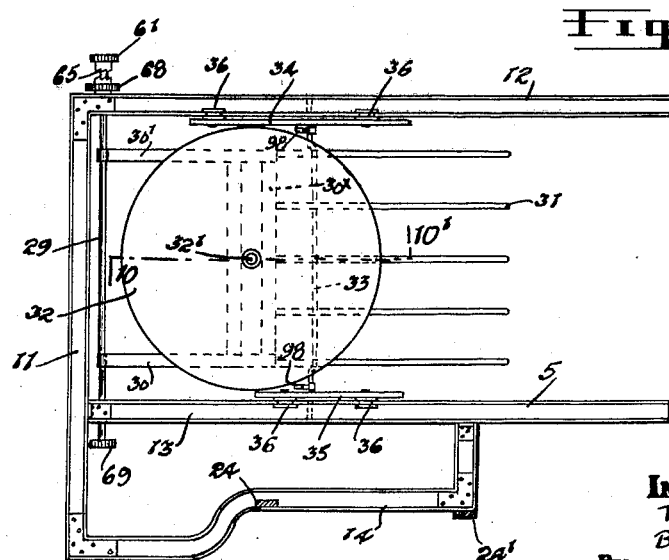

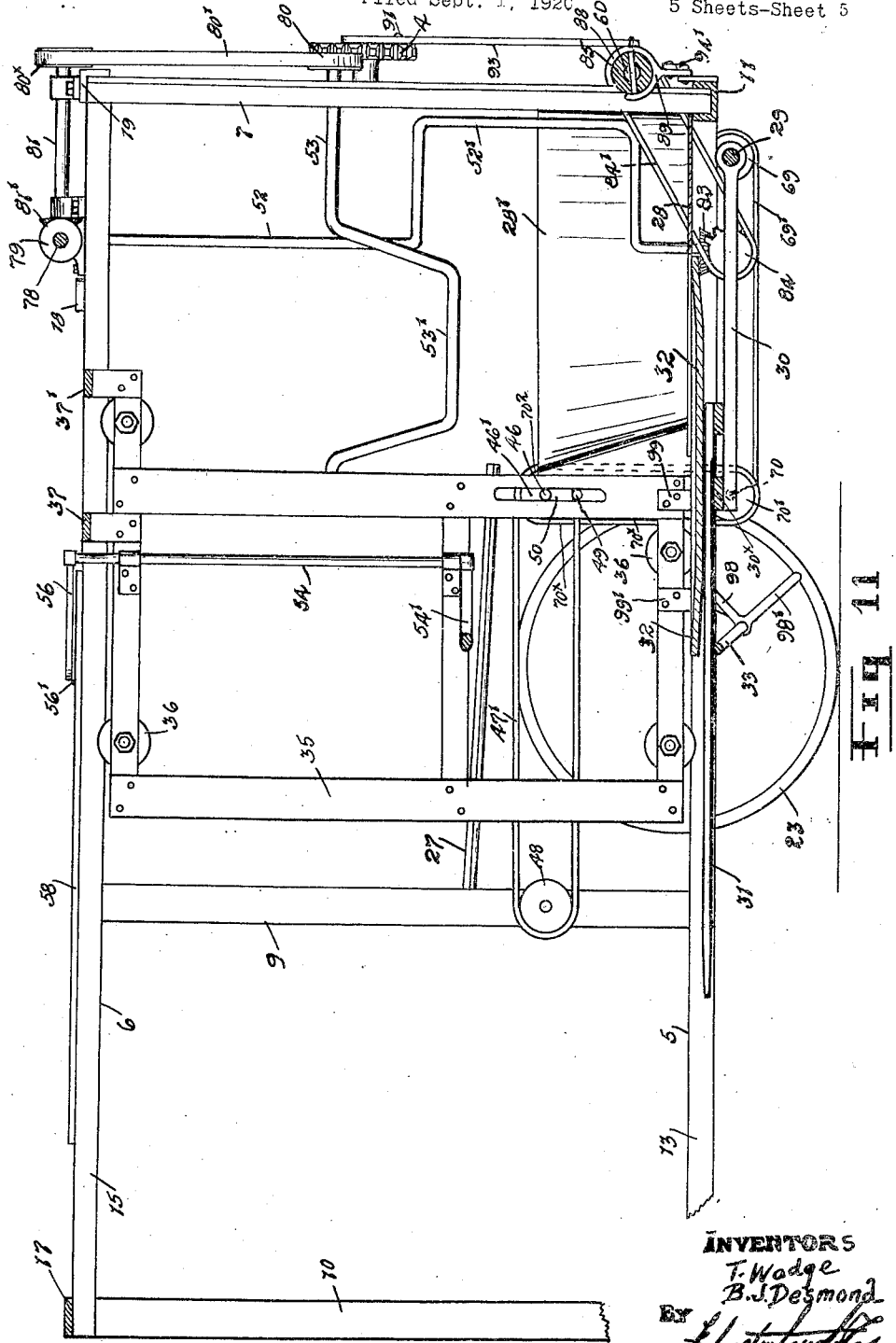

Patented Aug. 12, 1924.

1,504,533

UNITED STATES PATENT OFFICE.

THOMAS WADGE AND BERNARD JOSEPH DESMOND, OF WINNIPEG, MANITOBA, CANADA.

SHOCKING MACHINE.

Application filed September 1, 1920. Serial No. 407,394.

*To all whom it may concern:*

Be it known that we, THOMAS WADGE and BERNARD JOSEPH DESMOND, of the city of Winnipeg, in the Province of Manitoba, Canada, have invented certain new and useful Improvements in Shocking Machines, of which the following is the specification.

The invention relates to improvements in shocking machines and the general object of the invention is to provide a machine which will accompany a binding machine on the field and will receive the sheaves ejected from the binder deck, form them into a shock and deposit the shock in a standing position firmly planted on the ground.

A further object is to provide a machine wherein no rotating basket is used, but in which the sheaves are independently turned, prior to being passed into the shock former and the sheaf handled in turning so that there is very little possibility of the ripened grain being shaken out of the heads.

A further object of the invention is to construct the machine so that the various working parts are automatically controlled and with the entry of the sheaf and the formation of the shock directly controlled from the discharge arms of the binding machine.

A further object of the invention is to construct a rotary shock former having a telescoping divider and curtained divisions into which the sheaves are successively passed in the building of the shock and to arrange the curtains and divider so that they can be withdrawn in the depositing of the shock and thereby leave an open air space in the centre of the shock.

A further object is to provide a carriage associated with the formed shock which has a movement relative to the main frame and is arranged such that the carriage remains with the shock for a predetermined interval after the deposit of the shock and overcomes the upsetting momentum of the shock.

With the above more imporant objects in view the invention consists essentially in the arrangement and construction of parts hereinafter more particularly described and later pointed out in the appended claims.

Fig. 2 is a front view of the machine.

Fig. 3 is a plan view.

Fig. 4 is a side view of the side of the machine next the binder.

Fig. 7 is a vertical sectional view at 7 7' Fig. 6.

Fig. 8 is an enlarged detailed side view of the main controlling clutch.

Fig. 9 is a plan view of the rotating table and adjoining parts.

Fig. 10 is an enlarged detailed sectional view at 10 10' Fig. 9.

Fig. 11 is an enlarged vertical sectional view longitudinally through the machine.

Fig. 12 is an enlarged sectional view through a special bearing provided.

In the drawings like characters of reference indicate corresponding parts in the several figures.

Figure 1:
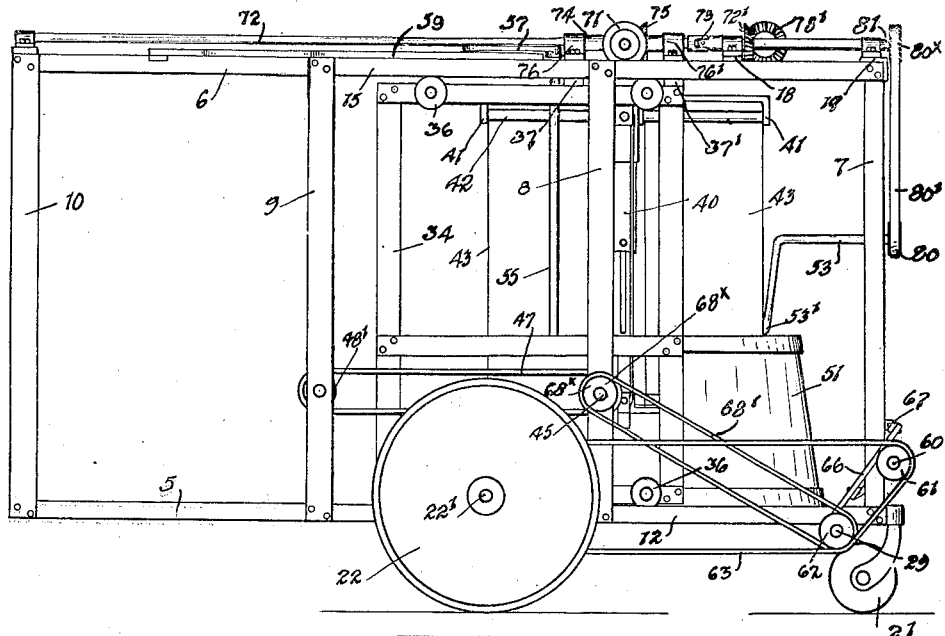
Fig. 1 is a side view of the shocking machine showing the side remote from the binder.

This machine is connected to the main frame of the customary binding machine at the deck side and is drawn over the field with the binder and received the sheaves ejected from the binder deck.

We have not considered it necessary to enter into the details of the construction of the binding machine as it is well known and in so far as the present description is concerned we have simply indicated the binder deck and ejector shaft with the discharge arms thereon.

1 is the deck of the ordinary binding machine from which the sheaves are discharged, the sheaves being ejected from the edge of the deck by the discharge arms 2 which are turned by the discharge arm shaft 3 which is driven by the wheel 4 in the direction indicated by the applied arrow in Fig. 2.

The shocking machine is located immediately at the side of the binder and adjoining the deck and presents a horizontally disposed receiving pan which receives the successive sheaves in a manner later described.

The shocking machine frame presents an under or lower frame structure 5 and a top or elevated frame structure 6, the top structure being supported from the bottom structure by suitably disposed side bars 7, 8, 9, and 10.

The under frame structure is formed from a front beam 11, two spaced parallel side beams 12 and 13 and an extension beam 14 located at the binder side of the main frame.

The top frame structure presents two spaced parallel side beams 15 and 16, a rear connecting cross beam 17 and a pair of spaced forwardly positioned cross beams 18 and 19 which have their inner ends or those towards the binder, extending above the forward part of the extension 14. The beams 18 and 19 are connected by cross bars 20 and 20' (see Fig. 3).

The front end of the under frame structure is carried by a central castor wheel 21. 22 and 23 are the main traction wheels supporting the main frame. The wheel 22 is rotatably mounted on a stub axle 22' extending outwardly from the under frame structure whilst the wheel 23 is secured to a cross axle 23' having the ends rotatably mounted in bearings provided on the beams 13 and 14.

To the beam 14 we secure a pair of uprights 24 and 24' which are positioned directly opposite the beams 8 and 9 and a cross bar 25 connects the upper end of the upright 24' with the beam 9 whilst a cross shaft 26 extends between the upper end of the upright 24 and the bar 8. To the cross shaft we permanently secure the forward end of a horizontally disposed receiving pan 27, the free end of which rests on cushioning springs 25' secured to the cross bar 25. This pan is disposed directly opposite the discharge end of the binder deck and receives the sheaves discharged therefrom by the discharge arms 2.

Immediately adjoining the forward end of the pan, but in a considerably lower plane, we locate a second pan 28 carried by the extension beam 14 and the beam 13 which pan is fitted with an upstanding inclining guard 28' which positively prevents the sheaf from falling outwardly off the pan 28.

Here we might explain that in the operation of the machine the free end of the pan 27 is swung upwardly to cause the sheaf to slide endwise off the said pan and take an upstanding position with the butt sitting on the pan 28 from which latter pan it is swept inwardly through the side of the main frame to a collecting table later referred to.

Forwardly of the machine we locate a main driving shaft 29 which is carried in suitable bearings provided by the under frame structure and is driven by the wheel 22 in a manner hereafter described.

30 and 30' are a pair of swinging arms having their front ends pivotally mounted on the shaft 29 and their rear ends connected permanently together by suitably disposed cross bars 30ˣ. Spaced fingers 31 extend rearwardly from the bars 30ˣ and directly above the said bars we locate a circular rotating table 32, the central pivot point of which is indicated at 32'. The arms 30 and 30' are maintained normally in a horizontal position, the arrangement being such that the table 32 is normally in the horizontal plane containing the pan 28, the sheaves being actually swept from the pan 28 onto the adjacent edge of the table.

The table is maintained in the horizontal position by a crank shaft 33 passing across the under frame structure and carried thereby and having the crank of the shaft normally up and engaging the under side of the fingers.

The main frame is constructed to present opposing pairs of upper and lower guide tracks, which in the present instance are the beams 12, 13, 15 and 16 such being channel irons and the inner flanges of all the channel irons are utilized as the tracks.

The tracks support for forward and backward movement within the frame, a carriage which comprises vertically disposed sides 34 and 35 fitted with rollers 36 riding the flanges or tracks and the sides are connected by elevated spaced cross bars 37 and 37' which support centrally a bearing plate 38 located in the forward position of the carriage directly above the centre point of the rotating table.

39 is a bevel pinion rotatably mounted on the plate 38 and having a boss 39' extending rotatably through the plate. To the boss we secure permanently the upper tube of a number of telescoping tubes 40, the lowermost tube just nicely clearing the table.

Figure 5:
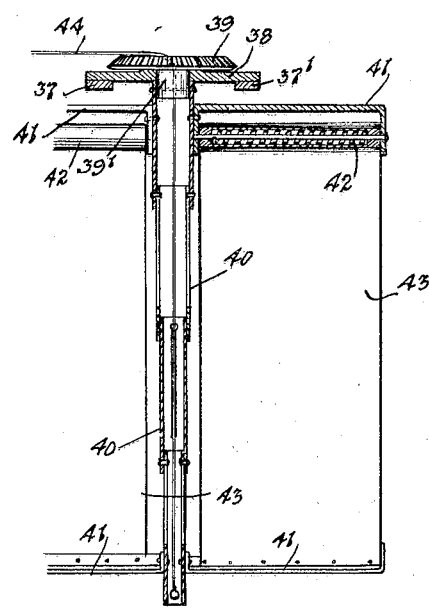
Fig. 5 is a vertical sectional view of the central telescoping divider and curtains associated therewith.

The upper and lower tubes carry each four equispaced radiating arms 41 and the upper arms are supplied with radially disposed spring rollers 42 on which we mount curtains 43, the free ends of which are attached to the lower arms 41. The arrangement above disclosed is such that when the tubes are extended as shown best in Fig. 5 the curtains will be pulled off the rollers and will consequently divide the space above the table into four sheaf receiving compartments one of which is normally directly opposite the pan 28. The springs are designed to roll up the curtains when the tubes are telescoped by a cable or other suitable means 44 attached to the lowermost tube and passing upwardly and out through the top of the bevel gear 39 and fastened to the front cross member 19 of the upper frame structure.

Obviously if the carriage moves back on the rollers within the main frame the cable, the front end of which is anchored to the main frame, will cause an upward pull in the lowermost tube and consequently effect the telescoping of the tubes and the rolling up of the curtains, the curtains and tubes actually withdrawing or pulling out of the shock formed on the table.

The said bars 8 of the main frame provide bearings for two short shafts 45 and 46 on which we mount chain wheels 45' and 46' and the chain wheels are connected by means of chains 47 and 47' to further chain wheels 48 and 48' mounted on short shafts carried by the upright frame bars 9. These chains are each fitted with an outstanding pin 49 which operates within a vertically disposed slot 50 provided in the side members of the carriage, the arrangements being such that when the chains are driven the pins moving into the slots cause the carriage to shift backwardly and forwardly within the main frame.

The carriage is fitted with a forwardly disposed sweep 51 which during the rearward movement of the carriage is adapted to gather the formed shock and forcibly sweep the shock off the table and on to the prongs. The inner end of the sweep terminates far enough back so that it will not prevent the passage of the sheaf from the pan 28 to the table.

Within the shield of the pan 28 we locate the crank 52' of a vertically disposed crank shaft 52 which is rotatably carried by the main frame and is driven from the bottom end and is timed so that after the pan 27 has deposited the sheaf in a standing position on the pan 28 the crank will pass in behind the sheaf and shove it forcibly towards the table. In order to pass the sheaf to its final position on the table we employ a second horizontally disposed crank shaft 53 suitably mounted in the frame and having the crank 53' positioned and timed so that it will pass in after the crank 52', strike the sheaf initially moved in by the crank 52' and push it further on to its final position on the table. In actual practice the sheaf so delivered on the table passes into one of the compartments formed between the curtains and after a sheaf has been delivered into the compartment the pinion 39 is rotated a quarter revolution which causes the curtains to turn and consequently the table so that an empty compartment is presented for the next oncoming sheaf. The carriage is fitted at opposite sides with upstanding rotatably mounted shafts 54 and 55 which carry extending prongs 54' and 55', the prongs being normally closed as shown in Fig. 3 and positioned at the other side of the table from the sweep 51 so that actually the shock is built up on the table within the compartments between the shield on the front side and the prongs at the rear side.

The prongs are held normally closed by cranks 56 and 57 secured to the upper ends of the shafts 54 and 55 and have their outer ends fitted with rollers 56' and 57', the rollers being received within guide ways 58 and 59 secured to the top frame structure.

Here it will be observed that these guide ways pass rearwardly parallel for a certain distance with the beams 15 and 16, then have their rearward ends deflected outwardly after which they continue straight for a short distance. Accordingly in the backward movement of the carriage the prongs 54' and 55' will remain closed for a period of the travel and will then gradually open, the opening action occurring as the rollers travel outwardly in the rearwardly diverging parts of the guides. When they are fully open the shock is free to escape.

The drives for the various moving parts are now described.

At the front of the machine we locate a driving shaft 60 parallel with the shaft 29 and on the shafts 60 and 29 we provide chain wheels 61 and 62 which are driven in the same direction by a chain 63 operating over a chain wheel 63' associated with the ground wheel 22.

On each of the shafts 60 and 29 we provide clutch members 64 and 65 both controlled by a clutch lever 66 and arranged such that when the lever is thrown in one direction one clutch member disengages and the other engages and vice versa when thrown in the other direction. The lever is controlled by an operating rod 67 passing across the front of the machine and terminating adjoining the customary driving seat on the binding machine.

During the interval that the shock is being built the shaft 60 is being driven and the shaft 29 is remaining stationary. One end of the shaft 29 is supplied with a chain wheel 68 which is provided with a chain 68' driving a chain wheel $68^x$ secured to the short shaft 45. The other end of the shaft 29 is supplied with a chain wheel 69 connected by means of a chain 69' to a chain wheel $69^x$ mounted on a short shaft 70 secured to the under frame structure.

A second chain wheel 70' (see Fig. 2) is mounted on the shaft 70 and is connected by means of a chain $70^x$ with a chain wheel $70^2$ secured to the short shaft 46.

According to this arrangement when the clutch 65 is thrown in the shaft 29 will effect the driving of the chains 47 and 47' and the consequent forward and backward travel of the carriage.

The pinion 39 is driven by a bevel pinion 71 operated by a second bevel pinion 71' and both rotatably mounted on the plate 38. 72 is a driving shaft positioned lengthwise of the machine and carried by the top frame structure. Forwardly the shaft is supplied with a universal joint indicated generally at 73 and the rear part of the shaft is substantially square in cross section and on it we mount a driving sleeve 74 positioned between the cross bars 37 and 37' and fitted with a bevel pinion 75 meshing with that 71'.

Here it is to be observed that two special bearings 76 and 76' are secured to the cross-bars 37 and 37' immediately at the ends of the sleeve 74 and that these bearings 76 and 76' are supplied with spool like sleeves 77 and 77' rotatably mounted in the bearings and fitted with square holes which receive the square end of the shaft 72 slidably.

According to this construction it will be seen that as the carriage moves backward and forward the sleeve 74 will slide on the shaft and consequently the bevel gears 71' and 75 are never out of mesh. The shaft 72 is fitted with a driving bevel pinion 72' which meshes with a bevel pinion 78' located on the inner end of a countershaft 78 rotatably carried by the top frame structure and the countershaft is supplied with two bevel pinions 79 and 79'.

The crank shaft 53 is fitted with a chain wheel 80 connected by means of a chain 80' to a chain wheel 80× located on the forward end of a short shaft 81 carried by the top frame structure, the shaft 81 being provided with a bevel gear 81' meshing with that 79. The crank shaft 52 is provided at the upper end with a bevel pinion 82 meshing with that 79'.

To the lower end of the crank shaft 52 we attach a bevel pinion 83 which meshes with a bevel pinion 83' secured to a short shaft 83× carried by the under frame structure and fitted also with a chain wheel 84 which is driven by a chain 84' directly from a chain wheel 84× mounted on the shaft 60.

The chain wheel 84× is formed with an extending sleeve 85 rotatably mounted on the shaft 60 and on the sleeve we mount a shifting clutch member 86 designed to engage with a fixed clutch member 87 permanently secured to the shaft 60. The clutch member 86 carries a band 88 and to the band we attach pivotally the upper end of a lever 89, the lower end of which is suitably fastened to the adjoining frame structure. A spring 90 is connected to the frame structure and the lever and is adapted to move the clutch positively in either direction after the lever has passed the vertical position.

The driving wheel 4 of the discharge arm shaft is provided with a driving pin 91 received within a slot 92 provided in the outer end of an operating bar 93, the inner end of which is attached to the lever 89. The arrangement of these parts is such that when the ejector shaft 3 is rotated to discharge a sheaf the bar 93 will be given an end movement sufficient to throw the movable clutch member 86 over past the central or upright position of the lever, the clutch member 88 finally going into engagement with the clutch member 87 under the action of the spring 90. These clutch members remain in clutch until thrown out by the action of a trip lever 94 pivotally secured to the under frame structure and connected by a link 94' to the lever 89. The lever 94 is positioned so that it is in the path of travel of the crank 52', such crank being adapted to strike the lever 94 when such lever is in its upright position and swing it over to the position best shown in Fig. 2 which movement disengages the clutch and consequently throws the parts driven by the chain 84' out of commission, such parts embodying the telescoping tubes 40 and the two cranks 52' and 53'.

In connection with the two clutches of the shaft 60, we may state that during the interval that the shock is being deposited the clutch 64 is out so that even although the clutch member 86 may be thrown into engagement with the clutch member 87, there will be no movement of the cranks 52' and 53' so that no sheaf is discharged from the pan 28 during the interval that the shock is being deposited.

In order to operate the pan 27 we have provided a crank 95 on the end of the shaft 26 and to the crank have connected a grab arm 95' having the hooked end 95× which is designed to engage a driving pin 96 extending from a disc 96' secured to the shaft 23'.

The grab arm is held up by a bracket 97 attached to the upright 24.

Referring to Fig. 4, it will be obvious that with the parts set as shown and in the advancement of the machine the pin 96 will engage the hooked end of the bar and carry it with it for a part of a revolution and sufficient to swing the crank and turn up the pan 27.

Obviously the pin will pass away from the hook after it has turned approximately half a revolution so that the pan is released to fall by gravity and is caught by the cushioning springs 25.

The crank shaft 33 controlling the raising and dropping action of the table and fingers 31 is controlled by the carriage in a manner such that when the carriage starts back the crank is allowed to rotate downwardly under the action of the weight of the shock where it remains until the carriage is practically returned to its original front position at which time the crank is rotated in the reverse direction to raise the table and fingers. This action of the crank is controlled in the present instance by a pair of crank arms 98 and 98' which are adapted to be engaged by strikers 99 and 99' secured to the carriage.

Figure 6:
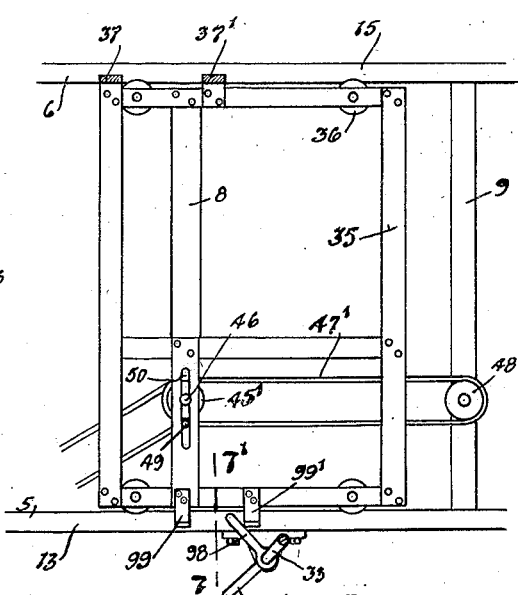
Fig. 6 is a detailed view showing one side of the carriage.

By referring to Fig. 6 it will be obvious that when the carriage starts to move back (to the right) the crank shaft is free to swing down under the action of the weight of the shock, the fingers and the table and that as the carriage moves back the crank 98 will pass entirely out of the path of travel of the strikers, whilst the crank 98' will pass up into the path of travel of the strikers and will be actually engaged by the striker 99 when the carriage is returning. After the striker 99 has engaged the crank arm 98′ the crank shaft will be rotated back to its original position and during this return action the crank arm 98 passes in front of the striker 99′ and takes its re-setting position or as shown in Fig. 6.

In order to clearly understand the action of this machine we will now give a short description of the manner in which it works considering that the machine is drawn over the ground with the binder and that the ejector arms are working to discharge sheaves off the deck on to the pan 27.

Each time a sheaf is discharged it is upended by the pan 27, deposited butt down on the pan 28 and swept on to the table by the combined action of the cranks 52′ and 53′. Each sheaf is independently handled and as the clutch members 86 and 87 are directly controlled by the ejector shaft it will be apparent that each time a sheaf is discharged the crank shafts are rotated as is also the telescoping tube 40 above the table. Consequently each time a sheaf is discharged the clutch members 86 and 87 are engaged, the cranks 52′ and 53′ operate and the tubular shaft rotates a quarter of a revolution and this action is stopped by the crank 52′ striking the lever 94. This throwing in and throwing out action of the clutch members 86 and 87 is continued until the attendant considers that he has enough sheaves on the table to form a proper shock and here it is pointed out that the shock is built on the table by sheaves successively entered into the compartments which are successively presented by the intermittent rotary action of the tube 14.

The shock built on the table is provided with an open centre, this by virtue of the tube 40 and curtains so that when it is ultimately deposited it has a well spread base and a good air circulating space.

When the attendant considers that a proper sized shock is built he operates the rod 67 to disengage the clutch 64 and engage the clutch 65. When this occurs the shaft 60 remains idle and that 29 is driven and the carriage is moved back in the frame to sweep the shock off the table on to the prongs and at the beginning of the carriage movement the crank 33 is dropped to allow the table and prongs to drop. Co-incident with the back going movement of the carriage the curtains and tubes are withdrawn upwardly by the action of the cable 44 and as the carriage reaches its rear position the prongs 54′ and 55′ are opened by the cranks 56 and 57, thereby liberating the shock and leaving it standing in an upright position on the field.

In connection with the back going movement of the carriage, we may state that this is timed so that the shock remains stationary relative to the ground during the depositing action so that there is no upsetting momentum to be overcome. In other words, the carriage goes back at a speed equal to the forward travel of the binder. In the return action of the carriage the prongs 54′ and 55′ are closed, the table and fingers are raised, the telescoping tubes fall down under their own weight and open the curtains and the attendant shifts the rod 67 to re-engage the clutch 64 and disengage that 65.

One might here make it clear that in the actual operation of the machine there is one sheaf in the pan 28 ready to be swept on to the table at the time the next sheaf is deposited from the deck on to the pan 27 so that at all times during the operation one sheaf is being delivered on to the pan 27 and off that pan on the pan 28 when the previous sheaf is being passed from the pan 28 on to the table.

What we claim as our invention is:—

1. In a shocking machine in combination, a rotatably mounted horizontally disposed table, withdrawable compartment forming members suspended above the table, means for delivering sheaves successively in a standing position on to the table and with the sheaves located in the compartments to form a shock, a plurality of normally horizontally disposed fingers extending to the rear of the table, means for withdrawing the compartment forming members upwardly from the formed shock, means for sweeping the shock off the table and on to the fingers and means for dropping the fingers to deposit the shock on the ground.

2. In a shocking machine in combination, a rotatably mounted horizontally disposed table, withdrawable compartment forming members suspended above the table, means for delivering sheaves successively in a standing position on to the table and with sheaves located in the compartments to form a shock, a carriage mounted for forward and backward movement and embodying a sweep normally positioned in advance of the shock and normally closed prongs positioned to the rear of the shock, a plurality of normally horizontally disposed fingers extending to the rear of the table, means for withdrawing the compartment forming members upwardly from the formed shock, means for moving the carriage rearwardly of the machine to pass the shock from the table on to the fingers, means for dropping the fingers to deposit the shock butt down on the ground and means for releasing the prongs to permit the shock to escape.

3. In a shocking machine in combination, a table, a carriage mounted for rearward and forward movement and comprising a sweep positioned normally at the front side of the table and a pair of normally closed prongs positioned at the rear side of the table, the said prongs, sweep and table forming a receptacle in which the shock is built, a plurality of forwardly pivoted fingers independent of the table and extending rearwardly therefrom, means normally maintaining the fingers in an elevated position above the ground, means for moving the carriage rearwardly at a predetermined time to sweep the formed shock from the table on to the fingers, means for dropping the fingers at a predetermined time to deposit the shock on the ground and means for opening the prongs at a predetermined instant to permit the same to escape from the fingers.

4. In a shocking machine, the combination, with an open main frame, of a pair of forwardly pivoted rearwardly extending side arms contained within the main frame, cross bars connecting the rear ends of the arms, a rotatably mounted sheaf receiving and shock forming table carried by the cross bars, spaced fingers extending rearwardly from the cross bars and independent of the table and releasable means normally supporting the rear ends of the arms and adapted when released to drop the fingers towards the ground.

5. In a shocking machine, the combination with a rotatably mounted table on which the shock is formed, of a plurality of curtains suspended above the table and forming sheaf receiving compartments and means for folding the curtains to withdraw them from the shock formed on the table.

6. In a shocking machine, the combination with a rotatably mounted table on which the shock is formed, of a plurality of vertically disposed telescoping tubes suspended centrally above the table, upper and lower pairs of horizontal arms radiating from the upper and lower tubes, spring actuated curtains connecting the arms of the pairs and forming sheaf receiving compartments above the table, means for rotating the tubes to turn the compartments in the forming of a shock on the table and means for telescoping the tubes to withdraw the curtains from the formed shock.

Signed at Winnipeg, this 2nd day of July, 1920.

THOMAS WADGE.
BERNARD JOSEPH DESMOND.
In the presence of:—
  GERALD S. ROXBURGH,
  K. B. WAKEFIELD.